United States Patent Office 3,652,544
Patented Mar. 28, 1972

3,652,544
3,4-BISNOR-5-AZA-B-HOMO-D-
HOMOANDROSTANES
Seymour D. Levine, North Brunswick, N.J., assignor to
E. R. Squibb & Sons, Inc., New York, N.Y.
No Drawing. Filed Dec. 18, 1968, Ser. No. 784,883
Int. Cl. C07d 25/02
U.S. Cl. 260—239 A                                 4 Claims

ABSTRACT OF THE DISCLOSURE

This invention relates to the preparation of novel steroidal β-lactams having the formula:

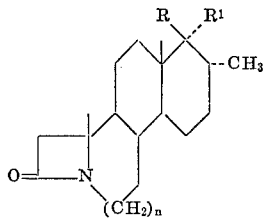

wherein R is hydroxy or acyloxy and $R^1$ is hydrogen and R and $R^1$ together are oxo (O=) and $n$ represents 1 or 2. The β-lactams of this invention are physiologically active materials possessing antiandrogenic activity.

---

This invention relates to and has as its objective the provision of novel physiologically active steroids and new intermediates useful in the preparation thereof.

The final products of this invention can be represented by the general formula:

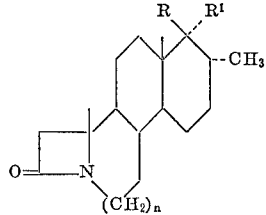

wherein R is hydroxy or acyloxy and $R^1$ is hydrogen and R and $R^1$ together are oxo (O=) and $n$ represents 1 or 2.

The final products of this invention are physiologically active substances useful in both human and veterinary medicine. They are highly useful agents in inhibiting or counteracting the effects of androgens (being therefore called anti-androgens) such as testosterone. For example, abatement of skin eruptions in cases of hyperandrogenic acne (the acne conditions resulting from the overabundance of an androgen such as testosterone) may be achieved by the peroral administration of the anti-androgens of this invention in dosages of from about 10 to 200 mg./kg. of body weight daily. They may also be administered systemically (e.g., subcutaneously) in a dosage of from about 2 to 60 mg./kg. of body weight daily. Further topical application may be employed in the treatment of this condition, utilizing, for instance, a cream or lotion containing from about 1 to 25% of the final product of this invention.

As anti-androgens, the final products of this invention have been found to be useful in veterinary medicine. Male swine, the meat of which is usually rendered unpalatable by a characteristic odor developed by the mature animal which permeates the meat, may be treated with the final products of this invention in order to suppress the formation of the odor and hence render the meat more palatable. Likewise the caponizing of male chickens may be achieved without resort to castration by means of administration of the final products of this invention. For these purposes they may be administered orally at a dosage of about 10 to 200 mg./kg. of body weight daily, or parenterally at a dosage of about 2 to 60 mg./kg. of body weight daily.

Perorally acceptable formulations can be prepared in the usual manner to provide an aqueous suspension, an elixir or a solid dosage unit form (e.g., tablet, powder or capsule), for example, two-piece hard gelatin capsules may be filled with a mixture of the active ingredient and excipients (e.g., starch, talc, stearic acid, and/or magnesium stearate). Also one-piece gelatin capsules containing the same amount of medicament may be prepared using sufficient corn oil or other suitable vegetable oil to render the compound capsulatable. Tablets may be prepared by using starch, lactose or other conventional excipients, and may be scored to enable the administration of fractional dosages, if desired. Any of the tableting material used in pharmaceutical practice may be employed. Liquid preparations may be in the form of suspensions, emulsions, syrups or elixirs of the active substance in water or other liquid medium commonly used for making orally acceptable pharmaceutical formulations, such as liquid paraffin, or a syrup elixir base.

The final products of this invention may be formulated into a preparation suitable for topical administration in conventional manner with the aid of one or more carriers or excipients. Examples of types of topical formulation include ointments, creams, sprays, aerosols and the like. Ointments and creams may, for example, be formulated with an aqueous or oily base with the addition of suitable thickening and/or gelling agents. Such bases may, for example, include water and/or an oil such as liquid paraffin or a vegetable oil such as castor oil, arachis oil, or the like. Various thickening agents may be employed in accordance with the nature of the base, for example, soft paraffin, aluminum stearate, cetostearyl alcohols, polyethylene glycols, woolfat, hydrogenated lanolin, and the like. Lotions may likewise be formulated with an aqueous or oily base and will in general also include various emulsifying agents, dispersing agents, suspending agents, thickening agents, coloring agents, perfumes, and the like.

In addition, the compounds of this invention (both intermediate and final products) are surface active agents which may therefore be employed in a variety of applications requiring such an agent. For example, the compounds of this invention may be employed as emulsifying agents in the preparation of lubricants, adhesives, polishes, wax compositions, and the like. For these purposes, the compounds of this invention may be employed in concentrations of about 0.5 to about 20.0 weight percent based upon the total composition.

The final products of this invention may be prepared beginning with either A-norprogesterone or A-nor-B-norprogesterone in accordance with the following reaction schema, wherein Ac represents acetyl:

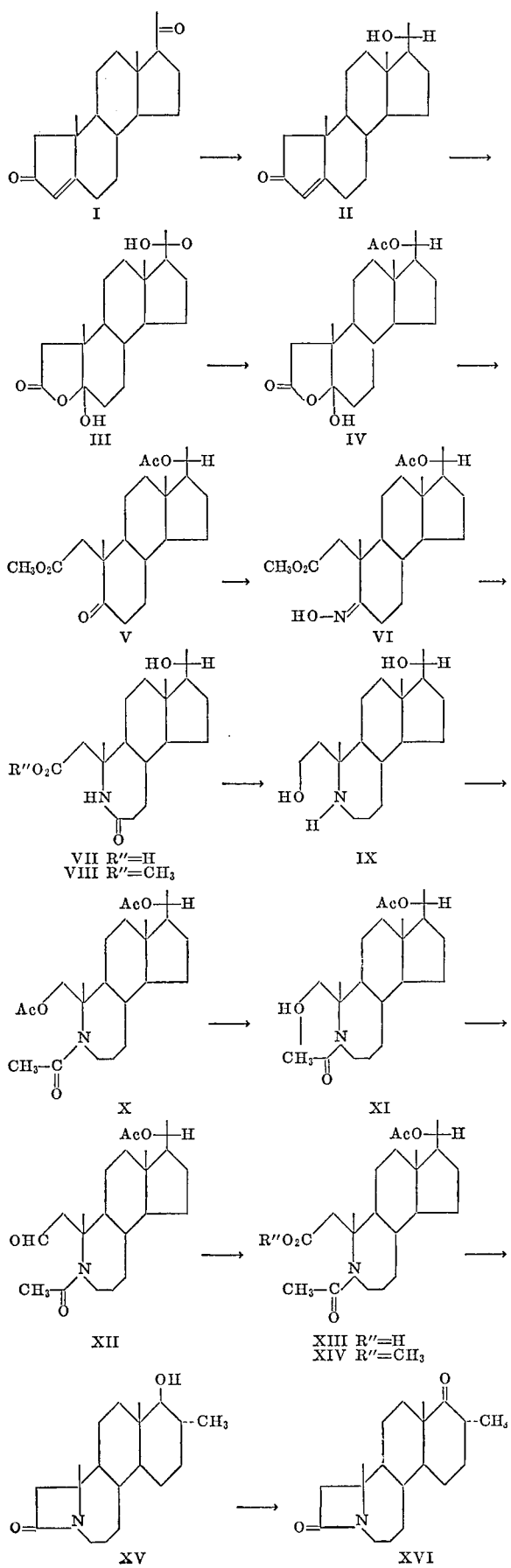

The acyl group is derived from a hydrocarbon carboxylic acid containing from 1 to 12 carbon atoms, saturated or unsaturated, straight chain or branched chain aliphatic, cyclic, cyclic-aliphatic, aromatic and may be substituted by functional groups such as hydroxy, acyloxy of up to 12 carbon atoms, alkoxy of up to 8 carbon atoms, amino or halogen. Typical ester groups are the acetate, propionate, butyrate, hemisuccinate, enanthate, caproate, benzoate, cyclopentylpropionate, aminoacetate and β-chloropropionate.

In the following description the preparation of the final products of this invention will be described employing A-norprogesterone as a starting material. The use of A-norprogesterone results in a final product possessing a seven-membered B-ring. It will be understood, however, that the preparation of compounds of this invention possessing a six-membered B-ring is achieved by the substitution of A-nor-B-norprogesterone as the starting material, all described reactions being carried out in the same manner as set forth below. A-norprogesterone is of course well known, F. L. Weisenborn and H. E. Applegate, JACS, 81, 1960 (1959). A-nor - B - norprogesterone has been disclosed in U.S. Pat. No. 3,331,868, issued to Holden et al., on July 18, 1967.

In the first step of the process of this invention, A-norprogesterone (I) is treated with sodium borohydride to produce 20-β-hydroxy-A-norpregn-3-en-2-one (II). The hydroxy Compound (II) thus prepared is then oxidized with potassium permanganate in the presence of sodium metaperiodate to give Compound III.

The 20-position of Compound III is then protected by acylating with a hydrocarbon carboxylic acid anhydride in the presence of pyridine. This product is then treated with diazomethane to give the methyl ester V.

The ester may then be treated with hydroxylamine hydrochloride in pyridine at room temperature to afford the oxime VI.

Beckman rearrangement of the oxime (with thionyl chloride in dioxane) followed by hydrolysis with 25% aqueous potassium hydroxide solution gives the lactam acid VII which may then be esterified with diazomethane to produce the methyl ester VIII.

Reduction of Compound VIII with lithium aluminum hydride in tetrahydrofuran gives the dihydroxy amine IX.

Compound IX is then acetylated with acetic anhydride in pyridine to obtain the N-acetyl diacetate X which is selectively hydrolyzed with potassium carbonate in methanol to the N-acetyl hydroxy acetate XI.

Oxidation of Compound XI with Jones reagent ($CrO_3$—$H_2SO_4$) at ice bath temperature gives the N-acetyl aldehyde XII which is then treated with silver oxide at room temperature to produce the N-acetyl amino acid XIII. If desired, Compound XIII may then be esterified with diazomethane to produce Compound XIV.

Compound XIII may be hydrolyzed in dioxane containing concentrated hydrochloric acid to remove the N-acetyl group and form the amino acid which is then cyclized by treatment at room temperature with dicyclohexylcarbodiimide in nitromethane to produce the steroidal β-lactam (XV), which is a final product of this invention. This compound may then be oxidized by treatment with Jones reagent to yield Compound XVI.

The invention may be illustrated by the following examples wherein all temperatures are in degrees centigrade:

EXAMPLE 1

3-oxa-A-norpregnane-5β,20β-diol-2-one

A solution of 1.0 g. of 20β-hydroxy-A-norpregn-3-en-2-one in 150 ml. of t-butanol is treated with a suspension of 1.38 g. of potassium carbonate, 0.18 g. of potassium permanganate, and 5.72 g. of sodium metaperiodate and stirred overnight at room temperature. The reaction mixture is diluted with water and extracted with chloroform. The chloroform extracts are washed with 8% salt solution, dried and evaporated. The residue is crystallized from chloroform acetone to give 413 mg. of 3-oxa-A-norpregnane-5β,20β-diol-2-one, M.P. 192–193°. Recrystallization from chloroform gives the analytical sample, M.P. 192–193°, [α]$_D$+29° (EtOH);

$\lambda^{KBr}$ 2.79, 2.82, 2.95, 5.64 and 5.79μ; $\tau^{TMS}_{CDCl_3}$ 9.21 (s., 18–Me), 8.89 (s., 19–Me), 8.86 (d., J=6 c./s., 21–Me) and 6.28 (m., 20α–H).

*Analysis.*—Calc'd for C$_{19}$H$_{30}$O$_4$ (percent): C, 70.77; H, 9.38. Found (percent): C, 70.67; H, 9.15.

EXAMPLE 2

3-oxa-A-norpregnane-5β,20β-diol-2-one 20-acetate

A solution of 10.0 g. of 3-oxa-A-norpregnane-5β,20β-diol-2-one in 13 ml. of acetic anhydride and 25 ml. of pyridine is left at room temperature for 4 hours. The mixture is diluted with water and extracted with chloroform. The chloroform extracts are washed with 2 N HCl, 8% salt solution, dried and evaporated. The residue is crystallized from chloroform-isopropyl ether to give 9.4 g. of 3 - oxa-A-norpregnane-5β,20β-diol-2-one-20-acetate, M.P. 167–168°. Recrystallization from acetone-isopropyl ether gives the analytical sample, M.P. 168–169°, [α]$_D$+ 57° (EtOH);

$\lambda^{KBr}$ 2.97, 5.71 and 5.79μ; $\tau^{TMS}_{CDCl_3}$ 9.33 (s., 18–Me), 8.87 (s., 19–Me), 8.85 (d., J=6 c./s., 21–Me), 7.97 (s, 20β-acetate) and 5.11 (m., 20α–H).

*Analysis.*—Calc'd for C$_{21}$H$_{32}$O$_5$ (percent): C, 69.20; H, 8.85. Found (percent): C, 69.09; H, 8.69.

EXAMPLE 3

Methyl 20β-acetoxy-2,5-seco-3,4-bisnorpregnane-5-one-2-oic acid

A solution of 3.57 g. of 3-oxa-A-norpregnane-5β,20β-diol-2-one 20-acetate in 8 ml. of methanol and 8 ml. of ether is treated with an excess of diazomethane in ether at room temperature for 12 minutes. Acetic acid is added and the mixture evaporated to dryness to give 3.85 g. of methyl 20β - acetoxy-2,5-seco-3,4-bisnorpregnane-5-one-2-oic acid, $\tau^{TMS}_{CDCl_3}$ 9,29 (s., 18–Me), 8.84 (d., J=6 c./s., 21–Me), 8.83 (s., 19–Me), 7.99 (s., 20β-acetate), 6.34 (s., 2–COC$_2$H$_3$) and 5.10 (m., 20α–H).

EXAMPLE 4

Methyl 5-oximino-20β-acetoxy-2,5-seco-3,4-bisnorpregnane-2-oic acid

A solution of 3.85 g. of methyl 20β-acetoxy-2,5-seco-3,4-bisnorpregnane-5-one 2-oic acid and 4 g. of hydroxylamine hydrochloride in 40 ml. of pyridine is left at room temperature for 40 hours. The mixture is diluted with water and extracted with chloroform. The chloroform extracts are washed with 2 N HCl, 8% salt solution, dried and evaporated to give 3.6 g. of methyl 5-oximino-20β-acetoxy-2,5-seco-3,4-bisnorpregnane-2-oic acid.

EXAMPLE 5

20β-hydroxy-2,5-seco-3,4-bisnor-5-aza-B-homopregnane-6-one-2-oic acid

A solution of 3.6 g. of methyl 5-oximino-20β-acetoxy-2,5-seco-3,4-bisnorpregnane-2-oic acid in 60 ml. of dioxane is cooled to 12° C. and treated with 4 ml. of thionyl chloride. The mixture is stirred for 9 minutes without cooling and then the reaction mixture is added to 170 ml. of 25% aqueous potassium hydroxide solution and heated to 80°. The mixture is cooled and extracted with ether. The aqueous portion is then acidified and extracted with chloroform. The chloroform extracts are washed with 8% salt solution, dried and evaporated. The residue is crystallized from methanol-isopropyl ether to give 1.39 g. of 20β - hydroxy - 2,5 - seco - 3,4 - bisnor - 5 - aza - B-homopregnane-6-one 2-oic acid; M.P. 266–267.5°. Recrystallization from methanol gives the analytical sample, M.P. 270–271.5°; $\lambda^{KBr}$ 2.86, 3.04, 3.11, 5.83 and 6.16μ.

*Analysis.*—Calc'd for C$_{19}$H$_{31}$NO$_4$ (percent): C, 67.62; H, 9.26; N, 4.15. Found (percent): C, 67.84; H, 9.59; N, 4.09.

EXAMPLE 6

Methyl 20β-hydroxy-2,5-seco-3,4-bisnor-5-aza-B-homopregnane-6-one 2-oic acid

Methylation of 20β-hydroxy-2,5-seco-3,4-bisnor-5-aza-B-homopregnane-6-one 2-oic acid by the procedure described in Example 3 gives methyl 20β-hydroxy-2,5-seco-3,4-bisnor-5-aza-B-homopregnane-6-one 2-oic acid, M.P. 151.5–152.5. Recrystallization from ethyl acetate-isopropyl ether gives the analytical sample, M.P. 154–155°; [α]$_D$+22° (EtOH);

$\lambda^{KBr}$ 2.87, 2.97, 5.81 and 6.10μ; $\tau^{TMS}_{CDCl_3}$ 9.20 (s., 18–Me) 8.87 (d., J=6 c./s., 21–Me), 8.58 (s., 19–Me), 6.3 (m., 20α–H) and 6.27 (s., 2–CO$^2$CH$^3$).

*Analysis.*—Calc'd for C$_{20}$H$_{33}$NO$_4$ (percent): C, 68.34; H, 9.46; N, 3.99. Found (percent): C, 68.21; H, 9.36; N, 3.80.

EXAMPLE 7

2,20β-dihydroxy-2,5-3,4-bisnor-5-aza-B-homopregnane

A solution of 2.5 g. of methyl 20β-hydroxy-2,5-seco-3,4-bisnor-5-aza-B-homopregnane-6-one 2-oic acid in 250 ml. of tetrahydrofuran is treated with 4 g. of lithium aluminum hydride and refluxed for 67 hours. The mixture is treated with ethyl acetate and water and the organic layer separated. The aqueous layer is extracted with chloroform. The combined organic extracts are washed with 8% salt solution, dried and evaporated. The residue is crystallized from ethyl acetate-isopropyl ether to give 1.05 g. of 2,20β-dihydroxy-2,5-seco-3,4-bisnor-5-aza-B-homopregnane, M.P. 158–159°. Recrystallization from ethyl acetate-isopropyl ether gives the analytical sample, M.P. 159–160.5°, [α]$_D$−20° (EtOH);

$\lambda^{KBr}$ 2.96 and 3.03μ; $\tau^{TMS}_{CDCl_3}$ 9.24 (s., 18–Me), 8.87 (d., J=6 c./s., 21–Me) and 8.81 (s., 19–Me).

*Analysis.*—Calc'd for C$_{19}$H$_{35}$NO$_2$ (percent): C, 73.73; H, 11.40; N, 4.53. Found (percent): C, 73.94; H, 11.45; N, 4.37.

EXAMPLE 8

N-acetyl-2,20β-diacetoxy-2,5-seco-3,4-bisnor-5-aza-B-homopregnane

A solution of 3.8 g. of 2,20β-dihydroxy-2,5-seco-3,4-bisnor-5-aza-B-homopregnane in 40 ml. of acetic anhydride and 40 ml. of pyridine is left at room temperature over the weekend. The mixture is diluted with water and extracted with chloroform. The chloroform extracts are washed with 2 N HCl, 8% salt solution, dried and evaporated to give 4.6 g. of N-acetyl-2,20β-diacetoxy-2,5-seco-3,4-bisnor-5-aza-B-homopregnane, $\tau^{TMS}_{CDCl_3}$ 9.33 (s., 18–Me), 8.87 (d., J=6 c./s., 21–Me), 8.63 (s., 19–Me), 7.98 (s., 2 and 20β-acetate), 7.93 (s., 5–N–Acetyl) and 5.13 (m., 20α–H)

EXAMPLE 9

N-acetyl-2-hydroxy-20β-acetoxy-2,5-seco-3,4-bisnor-5-aza-B-homopregnane

A solution of 1.4 g. of N-acetyl-2,20β-diacetoxy-2,5-seco-3,4-bisnor-5-aza-B-homopregnane in 4 ml. of 12.5% aqueous potassium hydroxide solution and 40 ml. of methanol is refluxed for 8 minutes and then left at room temperature for 0.5 hour. The mixture is concentrated and diluted with ice water. The precipitate is collected by filtration to give 1.07 g. of N-acetyl-2-hydroxy-20β- acetoxy-2,5-seco-3,4-bisnor-5-aza-B-homopregnane, M.P. 167–168.5°. Recrystallization from ether-isopropyl ether gives the analytical sample, M.P. 169.5–170.5°, $[\alpha]_D -9°$ (EtOH), $\lambda^{KBr}$ 2.83, 2.84, 5.84 and 6.12$\mu$; $\tau^{TMS}_{CDCl_3}$ 9.35 (s., 18–Me), 8.85 (d., J=6 c./s., 21–Me), 8.6 (s., 19–Me), 7.99 (s., 20$\beta$-acetate), 7.92 (s., 5–N–acetyl) and 5.15 (m., 20$\alpha$–H).

*Analysis.*—Calc'd for $C_{23}H_{39}NO_4$ (percent): C, 70.19; H, 9.99; N, 3.56. Found (percent): C, 70.06; H, 10.04; H, 3.41.

EXAMPLE 10

N-acetyl-20$\beta$-acetoxy-2,5-seco-3,4-bisnor-5-aza-B-homopregnane-2-al

A solution of 535 mg. of N-acetyl-2-hydroxy-20$\beta$-acetoxy-2,5-seco-3,4-bisnor-5-aza-B-homopregnane in 40 ml. of acetone at 3° is treated with an excess of Jones reagent and stirred at 3° for 1.75 hours. The mixture is treated with methanol, filtered through Hy-flo and evaporated. Plate chromotography of the residue on neutral alumina using chloroform-hexane (4:1) as the developing solvent gives a major band detected with iodine. Elution with ethyl acetate, evaporation and crystallization from acetone-isopropyl ether gives 75 mg. of N-acetyl-20$\beta$-acetoxy-2,5-seco-3,4-bisnor-5-aza-B-homopregnane-2-al, M.P. 159.5–160.5°. Recrystallization from acetone-isopropyl ether gives the analytical sample, M.P. 159.5–160.5°, $[\alpha]_D +19°$ (EtOH);

$\lambda^{KBr}$ 5.79, 5.84 and 6.09$\mu$; $\tau^{TMS}_{CDCl_3}$ 9.36 (s., 18–Me), 8.85 (d., J=6 c./s., 21–Me), 8.59 (s., 19–Me), 8.01 (s., 20$\beta$-acetate), 7.94 (s., 5–N–acetyl), 5.16 (m., 20$\alpha$–H) and 0.27 (t., J=1.6 c./s., 2–CHO).

*Analysis.*—Calc'd for $C_{23}H_{37}NO_4$ (percent): C, 70.55; H, 9.53; N, 3.58. Found (percent): C, 70.75; H, 9.49; N, 3.60.

EXAMPLE 11

N-acetyl 20$\beta$-acetoxy-2,5-seco-3,4-bisnor-5-aza-B-homopregnane-2-oic acid

A solution of 2.2 g. of silver nitrate in 23 ml. of water is added to a solution of 2.1 g. of N-acetyl 20$\beta$-acetoxy-2,5-seco-3,4-bisnor-5-aza-B-homopregnane-2-al in 45 ml. of ethanol. A solution of 2.2 g. of sodium hydroxide in 45 ml. of water is then added dropwise to the reaction mixture and the resulting suspension stirred in the dark for for hours. The reaction mixture is filtered and the precipitate washed with water. The filtrate is extracted with chloroform, and then acidified with 2 N HCl. The acidic phase is extracted with chloroform, washed with 8% salt solution, dried and evaporated. The residue is crystallized from acetone-isopropyl ether to give 957 mg. of N-acetyl 20$\beta$ - acetoxy-2,5-seco-3,4-bisnor-5-aza-B-homopregnane-2-oic acid, M.P. 172–173°. Recrystallization from acetone-isopropyl ether gives the analytical sample, M.P. 177–177.5°, $[\alpha]_D -21°$ (EtOH);

$\lambda^{KBr}$ 5.80 and 6.30$\mu$; $\tau^{TMS}_{CDCl_3}$ 9.35 (s., 18–Me), 8.86 (d., J=6 c./s., 21–Me), 8.47 (s., 19–Me), 7.99 (s., 20$\beta$-acetate), 7.91 (s., 5–N–acetyl) and 5.17 (m., 20$\alpha$-H).

*Analysis.*—Calc'd for $C_{23}H_{37}NO_5$ (percent): C, 67.78; H, 9.15; N, 3.44. Found (percent): C, 67.82; H, 9.12; N, 3.40.

EXAMPLE 12

Methyl N-acetyl-20$\beta$-acetoxy-2,5-seco-3,4-bisnor-5-aza-B-homopregnane-2-oic acid Methylation of N-acetyl-20$\beta$-acetoxy-2,5-seco-3,4 - bisnor-5-aza-B-homopregnane-2-oic acid by the procedure described in Example 3 gives methyl N-acetyl-20$b$-acetoxy-2,5-seco-3,4-bisnor-5-aza-B-homopregnane-2-oic acid, $\tau^{TMS}_{CDCl_3}$ 9.35 (s., 19–Me), 8.85 (d., J=6 c./s., 21–Me), 8.49 (s., 19–Me), 8.01 (s., 20$\beta$-acetate), 7.95 (s., 5–N–acetate), 6.39 (s., 2–CO$_2$CH$_3$) and 5.18 (m., 20$\alpha$–H).

EXAMPLE 13

17$\alpha$-methyl-17a$\beta$-hydroxy-3,4-bisnor-5-aza-B-homo-D-homoandrostane-2-one A solution of 1 g. of N-acetyl-20$\beta$-acetoxy-2,5-seco-3,4-bisnor-5-aza-B-homopregnane-2-oic acid in 1 ml. of water, 10 ml. of conc. HCl and 80 ml. of dioxane is refluxed overnight. The solution is evaporated, the residue dissolved in water and the pH adjusted to 5.1. The aqueous solution is extracted with chloroform several times. The aqueous phase is brought to pH 5.1 again, 8% salt solution added and the solution evaporated. The residue is extracted with warm chloroform, and the chloroform evaporated to give a 507 mg. residue.

The residue is dissolved in 20 ml. of methylene dichloride and 80 ml. of nitromethane, treated with 340 mg. of dicyclohexylcarbodiimide and stirred at room temperature over the weekend. The precipitate is removed by filtration and the filtrate evaporated to dryness. The residue is plate chromatographed on silica gel using chloroform-ethyl acetate (1:1) as the developing solvent. Elution of the major band (detected with iodine) with ethyl acetate containing 20% methanol an evaporation gives a residue which is crystallized from acetone-isopropyl ether to give 163 mg. of 17$\alpha$-methyl 17a$\beta$-hydroxy-3,4-bisnor-5-aza-B-homo-D-homoandrostane-2-one, M.P. 155–157°. Recrystallization from acetone-isopropyl ether gives the analytical sample, M.P. 158–159.5° $[\alpha]_D +27°$ (EtOH);

$\lambda^{KBr}$ 2.87, 5.73, and 5.79$\mu$; $\tau^{TMS}_{CDCl_3}$ 9,15 (s., 18–Me), 9.03 (d., J=6 c./s., 17$\alpha$–Me), 8.59 (s., 19–Me), and 8.22 (s., 17a$\beta$–OH).

*Analysis.*—Calc'd for $C_{19}H_{31}NO_2$ (percent): C, 74.71; H, 10.23; N, 4.99. Found (percent): C, 74.49; H, 10.29; H, 4.59.

EXAMPLE 14

17$\alpha$-methyl-3,4-bisnor-5-aza-B-homo-D-homoandrostane-2,17a-dione

A solution of 150 mg. of 17$\alpha$-methyl-17a$\beta$-hydroxy-3,4-bisnor-5-aza-B-homo-D-homoandrostane - 2 - one in 10 ml. of acetone is treated with a slight excess of Jones reagent. Methanol is added and the reaction mixture is filtered through Hy-flo. The filtrate is concentrated, diluted with water and the precipitate collected by filtration to give 41 mg. of 17$\alpha$-methyl-3,4-bisnor-5-aza-B-homo-D-homoandrostane-2,17a-dione, M.P. 193.5–195.5°. Recrystallization from acetone-isopropyl ether gives the analytical sample, M.P. 199–201°, $[\alpha]_D -12°$ (EtOH);

$\lambda^{KBr}$ 5.73 and 5.90$\mu$; $\tau^{TMS}_{CDCl_3}$ 9.02 (d., J=6 c./s., 17–Me), 8.88 (s., 18–Me), 8.60 (s., 19–Me) and 7.37 (s., 1–CH$_2$).

*Analysis.*—Calc'd for $C_{19}H_{29}NO_2$ (percent): C, 75.20; H, 9.63; N, 4.62. Found (percent): C, 75.48; H, 9.83; N, 4.53.

EXAMPLE 15

17$\alpha$-methyl-17a$\beta$-acetoxy-3,4-bisnor-5-aza-B-homo-D-homoandrostane-2-one A solution of 100 mg. of 17$\alpha$-methyl-17a$\beta$-hydroxy-3,4-bisnor-5-aza-B-homo-D-homoandrostane-2-one in 1 ml. of of pyridine is left at room temperature for four hours. The mixture is diluted with water and extracted with chloroform. The chloroform extracts are washed with 8% salt solution, dried and evaporated to give 17$\alpha$-methyl-17a$\beta$-acetoxy-3,4-bisnor-5-aza-B-homo-D-homoandrostane-2-one.

The invention may be variously otherwise embodied within the scope of the appended claims.

What is claimed is:
1. A compound of the formula

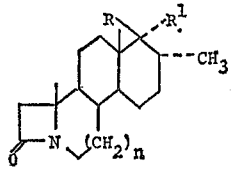

wherein R is hydroxy or acyloxy wherein the acyl group is derived from lower alkanoic acids of less than twelve carbon atoms and $R^1$ is hydrogen and R and $R^1$ together are oxo (O=) and $n$ represents 2.

2. A compound in accordance with claim 1 having the name 17α - methyl - 17aβ -acetoxy - 3,4 - bisnor - 5 - aza-B-homo-D-homoandrostane-2-one.

3. A compound in accordance with claim 1 having the name 17α - methyl - 3,4 - bisnor - 5 - aza - B - homo - D-homoandrostane-2,17a-dione.

4. A compound in accordance with claim 1 having the name 17α-methyl-17-aβ-hydroxy-3,4-bisnor-5-aza-B-homo-D-homoandrostane-2-one.

References Cited
Pappo et al.: Chem. Abst., 1967 (38144a).

ALEX MAZEL, Primary Examiner

B. I. DENTZ, Assistant Examiner

U.S. Cl. X.R.

260—239 BB, 239.3 T, 287 R, 289 R, 343.3, 468 R; 424—244, 258

PO-1050
(5/69)

UNITED STATES PATENT OFFICE
CERTIFICATE OF CORRECTION

Patent No. 3,652,544          Dated March 28, 1972

Inventor(s) Seymour D. Levine

It is certified that error appears in the above-identified patent and that said Letters Patent are hereby corrected as shown below:

Column 1, line 2, "BISNOR" should read--BIS NOR--.  Column 1, line 57, "conditions" should read--condition--.  Column 3, formula III,

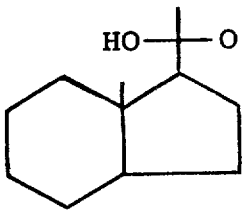     should be:     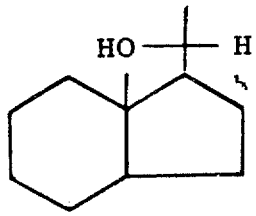

Column 3, formula XI,

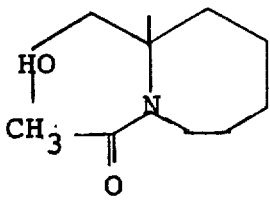     should be:     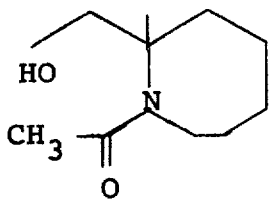

Column 4, line 38, "Beckman" should read--Beckmann--.
Column 5, line 44, "9,29" should read--9.29--.  Column 5, line 46, "$COC_2H_3$" should read--$CO_2CH_3$--.  Column 6, line 16, "151.5-152.5" should read--151.5-152.5°.--.  Column 6, line 22, "$CO^2CH^3$" should read--$CO_2CH_3$--.  Column 6, line 55, "dried" should read--dride--.  Column 7, line 50, "for" should read --four--.  Column 8, line 28, "an" should read--and--.
Column 8, line 30, "17α-methyl 17aβ" should read--17α-methyl-17aβ--.

Signed and sealed this 19th day of September 1972.

(SEAL)
Attest:

EDWARD M. FLETCHER, JR.                    ROBERT GOTTSCHALK
Attesting Officer                          Commissioner of Patents